Feb. 3, 1970 H. C. BYERS ET AL 3,493,908

COMPONENT ASSEMBLAGE WITH COCOON MEANS

Filed April 24, 1968

INVENTORS
HAROLD C. BYERS
GERALD W. ERICKSON
ROBERT M. GARDNER
BY

ATTORNEYS

United States Patent Office 3,493,908
Patented Feb. 3, 1970

3,493,908
COMPONENT ASSEMBLAGE WITH COCOON MEANS

Harold C. Byers, San Jose, and Gerald W. Erickson and Robert M. Gardner, Santa Clara, Calif., assignors to Pulse Engineering Inc., Santa Clara, Calif., a corporation of California Filed Apr. 24, 1968, Ser. No. 723,793
Int. Cl. H01f *15/02*
U.S. Cl. 336—96 5 Claims

ABSTRACT OF THE DISCLOSURE

A component assemblage in which an electrical component with wire leads is loosely confined within a cocoon means. Each of the leads is fixedly embedded in the cocoon means for connection to electrical terminals. The subassembly cocoon means may be encapsulated in suitable plastic.

Background of the invention

The present invention relates to component assemblages and more particularly to assemblages including cocoon means for confining an electrical component.

The provision of suitable component casings is difficult for miniaturized and relatively fragile electrical components such as pulse transformers. For example, during the casing process, mechanical handling may alter the geometry of the transformer, thus changing its electrical characteristics. Where it is necessary to encapsulate the component, the encapsulation material may deleteriously affect the magnetic, or the insulating, or dielectric properties of the component.

Objects and summary of the invention

It is, therefore, a general object of the present invention to provide an improved component assemblage.

It is another object of the present invention to provide a component assemblage in which the electrical characteristics of an electrical component contained therein are less adversely affected.

It is a further object of the present invention to provide a component assemblage in which the electrical component contained therein is shielded from external forces.

In accordance with the above objects, there is provided a component assemblage including an electrical component having leads. Cocoon means relatively loosely confine the electrical component and hold the component leads. The leads may be connected to relatively rigid electrical conductors or terminals carried by the cocoon means to form a sub-assembly.

Detailed description of preferred embodiment

Figure 1:
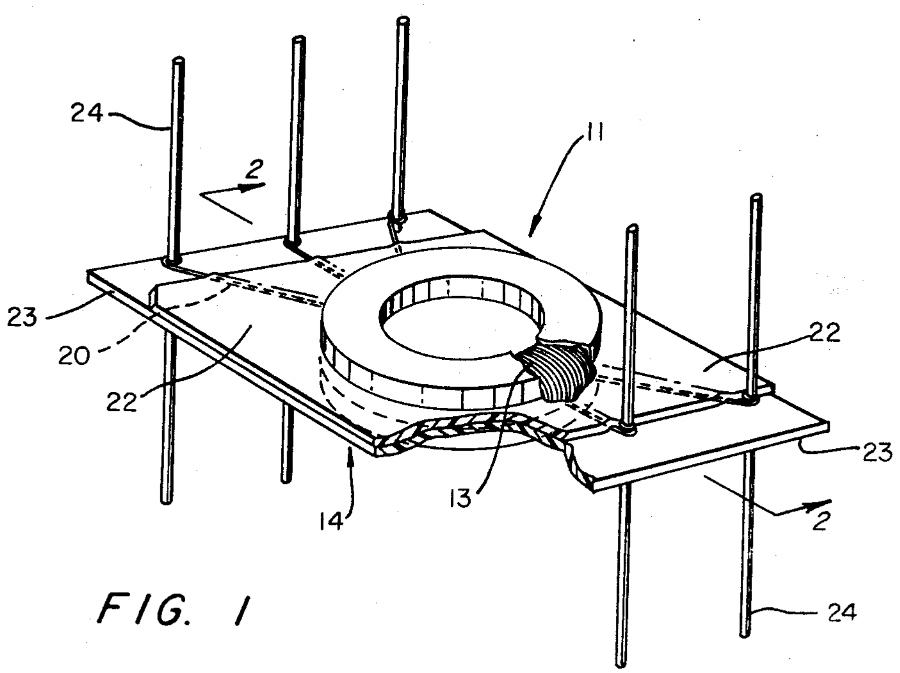
FIGURE 1 is a perspective view of an electrical component confined by a cocoon means with the cocoon being partially broken away to show the interior construction.
Figure 2:
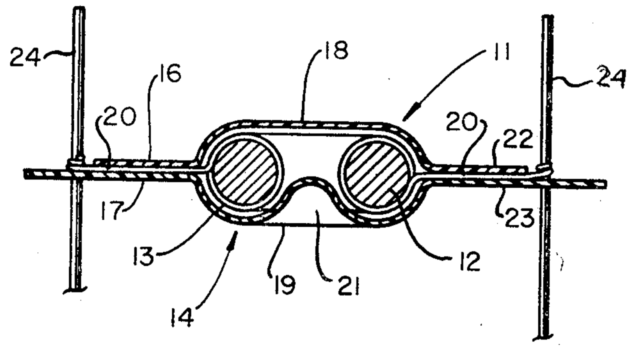
FIGURE 2 is a cross-sectional view of an alternative embodiment taken generally along the line 2—2 of FIGURE 1.

Referring now to FIGURES 1 and 2, an electrical component 11 which, in the specific embodiment of this invention, is a pulse transformer with a toroidal core 12 and windings 13, is encased in cocoon means 14. As best shown in FIGURE 2, the cocoon includes a top section 16 and a bottom section 17. The two sections include lip portions which are joined to one another with the electrical component 11 housed between the two sections.

The top section 16 includes a cupped portion 18 which registers with a similarly cupped portion 19 on the bottom section 17 to form the housing for the component 11. The cupped portion 19 includes a dimple 21 which engages the opening of the toroidal core 12 to hold the component 11 against lateral movement within the housing.

The electrical component 11 includes a plurality of leads 20 which are embedded between the lip portions 22 and 23 of the sections 16 and 17, respectively, as best shown in FIGURE 1. The leads are connected to electrical conductors or terminals 24 which extend through the lip portions 22 and 23 of cocoon 14. The terminals are more rigid than the fine wire leads associated with the component and serve as the connection between the component assembly and associated circuits such as a printed circuit board.

More specifically, in the preferred embodiment, the electrical component comprises a pulse transformer 11 which includes windings 13. Each of the windings has a pair of leads extending therefrom for connection to the electrical conductors or terminals 24.

By confining the pulse transformer 11 within the cocoon means 14, the windings are not subjected to mechanical forces which would occur if the encapsulating material were placed in direct contact with the windings. Such forces would move or stretch the windings 13 or leads 20. Thus, the electrical characteristics, inductance, capacitance and resistance of the electrical component may be determined when the component is formed and will not be affected when the component is encapsulated.

In addition, the cocoon means 14 contacts the component only at a few points. Thus, the remainder of the component is surrounded by air which has a low dielectric constant. In the case of pulse transformers and many other components, this considerably reduces the stray capacitance and, therefore, makes the component useful for high frequency operations.

As previously explained, in the prior art the electrical component was placed in a housing or case and then the leads connected to associated terminals. Not only is the process time consuming, but it also might cause damage of the electrical component. In accordance with the present invention, the cocoon sub-assembly may be placed in a mold and the complete sub-assembly encapsulated by conventional molding techniques.

Figure 3:
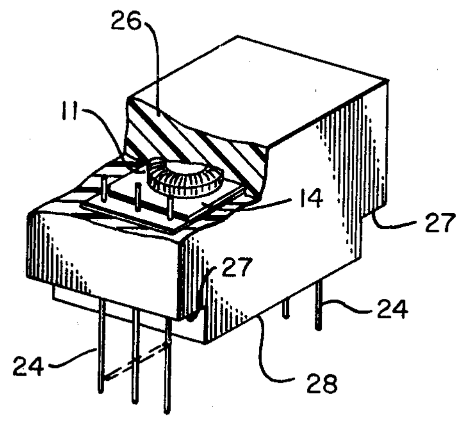
FIGURE 3 is a perspective view of an encapsulated subassembly with a portion of the encapsulation broken away to expose the cocoon.

Thus, in actual use, the cocoon sub-assembly of FIGURES 1 and 2 is placed in a mold and plastic material is molded thereabout to the desired shape and outside configuration. Referring to FIGURE 3, the component and cocoon 11, 14 are shown embedded in plastic material 26. The plastic material also serves to embed the electrical terminals or conductors 24 to rigidly hold the same. The components extend downwardly from the shoulder or step 27. Thus, the components may be bent outwardly where the bottom portion 28 of the outer case may rest directly against an electrical circuit board with the leads extending outwardly and connetcted to associated circuitry. On the other hand, the leads may extend downwardly through the board and be connected on the opposite side.

Thus, the present invention provides an improved component assemblage in which the electrical characteristics of the electrical component contained within the assemblage are not adversely affected during assembly and encapsulation.

We claim:

1. A component assemblage comprising an electrical component having leads, cocoon means including top and bottom cupped sections with outwardly extending lip portions joined to one another to define a housing serving to house said electrical component with a portion of said component leads embedded in said lip portions, and means for encapsulating said cocoon and electrical component.

2. A component assemblage as in claim 1 in which said electrical component is a pulse transformer having an annular core carrying one or more windings, and said component leads connected to the windings and extending away from the transformer core.

3. A component assemblage comprising an electrical component having leads, cocoon means including top and bottom cupped sections with outwardly extending lip portions joined to one another to define a housing serving to house said electrical component, the lateral extent of one of said lip portions being less than the other, said component leads being sandwiched between said lip portions, and a plurality of terminals corresponding to selected leads held by one of said lip portions with the ends of said leads being connected to said terminals adjacent said cocoon means.

4. A component assemblage as in claim 3 together with means for encapsulating said cocoon, electrical component and terminals.

5. A component assemblage as in claim 4 in which said electrical component is a pulse transformer having an annular core carrying one or more windings, and wire leads connected to the windings and extending away from the transformer core.

References Cited

UNITED STATES PATENTS

| | | | |
|---|---|---|---|
| 2,275,967 | 3/1942 | Keillor et al. | 336—209 |
| 2,863,994 | 12/1958 | Kohring | 174—52.6 |
| 3,155,766 | 11/1964 | Eichert et al. | 174—52.6 |
| 3,210,701 | 10/1965 | Fastner et al. | 336—96 |
| 3,237,137 | 2/1966 | Flaminio | 336—209 |
| 3,266,000 | 8/1966 | Markarian | 336—229 |
| 3,332,048 | 7/1967 | Renskers | 336—65 |
| 3,368,276 | 2/1967 | Renskers | 336—192 |

FOREIGN PATENTS

| | | |
|---|---|---|
| 888,370 | 1/1962 | Great Britain. |
| 977,030 | 12/1964 | Great Britain. |

THOMAS J. KOZMA, Primary Examiner

U.S. Cl. X.R.

174—52; 336—192, 229